United States Patent
Hu et al.

(10) Patent No.: US 10,698,943 B2
(45) Date of Patent: Jun. 30, 2020

(54) METHOD AND APPARATUS FOR RECOGNIZING SLIDE

(71) Applicants: Beijing Kingsoft Office Software, Inc., Beijing (CN); Zhuhai Kingsoft Office Software Co., Ltd, Zhuhai (CN); Guangzhou Kingsoft Mobile Technology Co., Ltd, Guangzhou (CN)

(72) Inventors: Juan Hu, Zhuhai (CN); Qian Wang, Zhuhai (CN); Xian Zhou, Zhuhai (CN); Yong Zhuang, Zhuhai (CN)

(73) Assignee: BEIJING KINGSOFT OFFICE SOFTWARE, INC., Beijing (CN)

( * ) Notice: Subject to any disclaimer, the term of this patent is extended or adjusted under 35 U.S.C. 154(b) by 0 days.

(21) Appl. No.: 15/780,077

(22) PCT Filed: Nov. 15, 2016

(86) PCT No.: PCT/CN2016/105885
§ 371 (c)(1),
(2) Date: May 30, 2018

(87) PCT Pub. No.: WO2017/114015
PCT Pub. Date: Jul. 6, 2017

(65) Prior Publication Data
US 2018/0365245 A1     Dec. 20, 2018

(30) Foreign Application Priority Data

Dec. 31, 2015 (CN) .......................... 2015 1 1033937

(51) Int. Cl.
*G06F 16/438* (2019.01)
*G06F 40/106* (2020.01)
(Continued)

(52) U.S. Cl.
CPC ........ *G06F 16/4393* (2019.01); *G06F 40/106* (2020.01); *G06F 40/186* (2020.01); *G06F 40/189* (2020.01); *G06T 11/203* (2013.01)

(58) Field of Classification Search
CPC .. G06F 16/4393; G06F 17/248; G06F 17/212; G06F 17/25; G06T 11/203
See application file for complete search history.

(56) References Cited

U.S. PATENT DOCUMENTS

| | | |
|---|---|---|
| 7,383,499 B2 | 6/2008 | Kraft et al. |
| 2006/0048096 A1 | 3/2006 | Jiang et al. |

(Continued)

FOREIGN PATENT DOCUMENTS

| | | |
|---|---|---|
| CN | 1389809 A | 1/2003 |
| CN | 1862533 A | 11/2006 |

(Continued)

OTHER PUBLICATIONS

International Search Report and Written Opinion dated Feb. 13, 2017, in PCT/CN2016/105885.

(Continued)

*Primary Examiner* — Ajay M Bhatia
*Assistant Examiner* — Mong-Shune Chung
(74) *Attorney, Agent, or Firm* — Patterson & Sheridan, LLP; Steven H. Versteeg

(57) ABSTRACT

Embodiments of the present application disclose a method and an apparatus for identifying a slide, which are applied to an electronic device. The method comprises: obtaining file source code of a slide to be identified (S101); obtaining feature information of objects in the slide to be identified from the file source code (S102); and determining a layout of the slide to be identified based on the obtained feature information (S103). In the present application, the electronic device can automatically obtain the feature information of (Continued)

the objects in the slide to be identified from the file source code of the slide. Therefore, compared to manual identification, the efficiency and accuracy of identifying the layout of the slide are significantly improved. Moreover, this makes it possible to perform subsequent automatic processes on the slide based on the layout of the slide.

10 Claims, 12 Drawing Sheets

(51) Int. Cl.
　　　*G06F 40/186*　　　(2020.01)
　　　*G06F 40/189*　　　(2020.01)
　　　*G06T 11/20*　　　(2006.01)

(56) References Cited

U.S. PATENT DOCUMENTS

| | | | |
|---|---|---|---|
| 2006/0069989 A1 | 3/2006 | Jones et al. | |
| 2006/0150088 A1 | 7/2006 | Kraft et al. | |
| 2006/0259858 A1* | 11/2006 | Collins | G06F 17/211 715/243 |
| 2006/0282779 A1* | 12/2006 | Collins | G06F 17/248 715/732 |
| 2013/0239001 A1* | 9/2013 | Maloney | G06F 17/211 715/732 |
| 2014/0053071 A1 | 2/2014 | Penner | |
| 2014/0298218 A1 | 10/2014 | Gera et al. | |
| 2016/0124918 A1* | 5/2016 | Ying | G06F 16/9535 715/234 |

FOREIGN PATENT DOCUMENTS

| | | |
|---|---|---|
| CN | 102169483 A | 8/2011 |
| CN | 102841893 A | 12/2012 |
| CN | 104199808 A * | 12/2014 |
| CN | 104199808 A | 12/2014 |
| CN | 104737185 A | 6/2015 |
| WO | 2009081791 A1 | 7/2009 |

OTHER PUBLICATIONS

Office Action issued in corresponding Chinese Patent Application No. 201511033937.X, dated Aug. 27, 2019 (7 pages).
Office Action issued in corresponding Japanese Patent Application No. 2018-529114, dated Jul. 31, 2019 (4 pages).
Wikipedia, "Open Document" https://en.wikipedia.org/w/index.php?title=OpenDocument&oldid=697228039; Dec. 29, 2015 (11 pages).
Wikipedia; https://en.wikipedia.org/w/index.php?title=Office_Open_XML&oldid=688926918; Nov. 3, 2015 (10 pages).
Extended European Search Report issued in corresponding European Patent Application No. 168808053, dated Jun. 13, 2019 (12 pages).

* cited by examiner

Please add title here

|          | Subtitle             | Subtitle             | Subtitle             |
|----------|----------------------|----------------------|----------------------|
| Subtitle | Please add text here | Please add text here | Please add text here |
| Subtitle | Please add text here | Please add text here | Please add text here |
| Subtitle | Please add text here | Please add text here | Please add text here |

Please add title here

METHOD AND APPARATUS FOR RECOGNIZING SLIDE

CROSS-REFERENCE TO RELATED APPLICATIONS

The present application is a national stage application under 35 U.S.C. 371 of PCT/CN2016/105885, filed Nov. 15, 2016, which claims priority to a Chinese Patent Application No. 201511033937.X, filed with the State Intellectual Property Office of the People's Republic of China on Dec. 31, 2015, and entitled "Method and Apparatus for Recognizing Slide", both of which are incorporated herein by reference in their entirety.

TECHNICAL FIELD

The present application relates to the field of office software, and in particular to a method and an apparatus for identifying a slide.

BACKGROUND

With the development of science and technology, it becomes more and more common to use office software for office work.

Presentation software is an important component of the office software. A user can not only show a presentation on a projector or a computer, but also can print out the presentation and create films for uses in more fields. A presentation consists of a plurality of slides, and different slides have different layouts. Before beautifying a slide or changing the layout of a slide, it is necessary to identify the layout of the slide.

In the prior art, the layout of a slide is identified manually, which is inefficient and error-prone and is not conducive for batch processing on slides.

SUMMARY OF THE INVENTION

The object of embodiments of the present application is to provide a method and an apparatus for identifying a slide, to identify a slide layout automatically.

In order to achieve the object noted above, an embodiment of the present application discloses a method for identifying a slide, which is applied to an electronic device, including:
  obtaining file source code of a slide to be identified;
  obtaining feature information of objects in the slide to be identified from the file source code; and
  determining a layout of the slide to be identified based on the obtained feature information.

Preferably, the electronic device is a server, which stores slide templates having a plurality of layouts, and the server can send the slide templates to a terminal device, and the method further includes:
  searching for a slide template having the determined layout in the server;
  sending the found slide template to the terminal device, such that the terminal device copies the contents in each object in the slide to be identified to a corresponding object in the received slide template to obtain a modified slide.

Preferably, the electronic device is a terminal device, which stores slide templates having a plurality of layouts, and the method further includes:
  searching for a slide template having the determined layout in the terminal device;
  copying contents in each of the objects in the slide to be identified to a corresponding object in the slide template to obtain a modified slide.

Preferably, the objects include placeholders, and the feature information of the objects in the slide to be identified includes at least one of the: number information of the placeholders in the slide, size information of the placeholders in the slide, type information of the placeholders in the slide, position information of the placeholders in the slide, sequence information of the placeholders in the slide.

Preferably, when the feature information is the number information of the placeholders in the slide, obtaining feature information of objects in the slide to be identified from the file source code includes:
  searching for all parameter names, that denote placeholders, in the file source code to obtain the number information of the placeholders in the slide to be identified;
  when the feature information is the size information of the placeholders in the slide, obtaining feature information of objects in the slide to be identified from the file source code comprises:
  searching for a parameter value corresponding to a parameter name relating to the size of each placeholder to obtain the size information of each placeholder in the slide to be identified;
  when the feature information is the type information of the placeholders in the slide, obtaining feature information of objects in the slide to be identified from the file source code comprises:
  determining a type of each parameter name, that denote a placeholder, in the file source code to obtain the type information of each placeholder in the slide to be identified;
  when the feature information is the position information of the placeholders in the slide, obtaining feature information of objects in the slide to be identified from the file source code comprises:
  determining a vertical distance from the top left corner of each placeholder to the left side of a baseplate of the slide and a vertical distance to the top side of the baseplate of the slide, and determining the two vertical distances as the position information of this placeholder in the slide; and
  when the feature information is the sequence information of the placeholders in the slide, obtaining feature information of objects in the slide to be identified from the file source code comprises:
  adding a virtual two-dimensional rectangular plane coordinate system to the slide to be identified according to a preset rule; obtaining the position of the center point of each placeholder; drawing a straight line with a preset slope, through the center point of each placeholder, in the two-dimensional rectangular plane coordinate system, wherein the straight line intersects with the y-axis of the two-dimensional rectangular plane coordinate system at a point; determining the sequence of the placeholders according to ordinate values of intersection points on the y-axis, wherein the greater the ordinate value of an intersection point on the y-axis is, the smaller the sequence number of a placeholder will be, and if there are a plurality of straight lines corresponding to a plurality of placeholders intersect with y-axis at a same point, sequence numbers of the placeholders are determined in such a way that a sequence number of a placeholder on the left is smaller than a sequence number of a placeholder on the right; and obtaining the sequence information of each placeholder in the slide to be identified.

Preferably, the objects include placeholders, and the feature information of the objects comprises: connection elements between the placeholders, serial number elements corresponding to the placeholders, distances between the placeholders, and arrangement of the placeholders;

determining a layout of the slide to be identified based on the obtained feature information comprises:

determining the layout of the slide to be identified as a step-style layout, if there are directional connection elements between the placeholders and the connection elements point to a same direction;

determining the layout of the slide to be identified as a step-style layout, if each of the placeholders has a corresponding serial number element;

determining the layout of the slide to be identified as a cycle-style layout, if there are directional connection elements between the placeholders and any placeholder has only one connection element pointing to it and one connection element that starts from it and points to another placeholder;

determining the layout of the slide to be identified as a summary-partition-style layout, if the distances from one placeholder to all the other placeholders are the same;

determining the layout of the slide to be identified as a comparison-style layout, if all the placeholders are arranged in a two-dimensional list;

determining the layout of the slide to be identified as a pyramid-style layout, if all the placeholders are arranged in a triangle or trapezoid;

determining the layout of the slide to be identified as a tree-style layout, if there are connection elements that connect one placeholder to a plurality of placeholders among all the placeholders; and determining the layout of the slide to be identified as a parallel-style layout, if the layout of the slide to be identified is not any one of a step-style layout, cycle-style layout, summary-partition-style layout, comparison-style layout, pyramid-style layout, and tree-style layout.

Preferably, the method further includes:

receiving a modification instruction for the modified slide sent by the terminal device;

sending thumbnails of a plurality of slide templates corresponding to the modification instruction to the terminal device;

receiving identification information of a slide template, that corresponds to a thumbnail selected by a user and is sent by the terminal device;

sending a slide template having the identification information to the terminal device, such that the terminal device copies the contents in each object in the modified slide to a corresponding object in the slide template having the identification information to obtain a modified slide.

An embodiment of the present application further discloses an apparatus for identifying a slide, which is applied to an electronic device, and the apparatus includes:

a file source code obtaining module, configured for obtaining file source code of a slide to be identified;

an object feature information obtaining module, configured for obtaining feature information of objects in the slide to be identified from the file source code;

a slide layout determining module, configured for determining a layout of the slide to be identified based on the obtained feature information.

Preferably, the electronic device is a server, which stores slide templates having a plurality of layouts, and the server can send the slide templates to a terminal device, and the apparatus further includes:

a first finding module, configured for searching for a slide template having the determined layout in the electronic device; and a first template sending module, configured for sending the found slide template to the terminal device, such that the terminal device copies the contents in each object in the slide to be identified to a corresponding object in the received slide template to obtain a modified slide.

Preferably, the electronic device is a terminal device, which stores slide templates having a plurality of layouts, and the apparatus further includes:

a second finding module, configured for searching for a slide template having the determined layout in the terminal device; and a content copying module, configured for copying contents in each of the objects in the slide to be identified to a corresponding object in the slide template to obtain a modified slide.

Preferably, the feature information of the objects in the slide to be identified includes at least one of the: number information of the placeholders in the slide, size information of the placeholders in the slide, type information of the placeholders in the slide, position information of the placeholders in the slide, sequence information of the placeholders in the slide. When the feature information is the number information of the placeholders in the slide, the object feature information obtaining module comprises:

a number information obtaining sub-module, configured for searching for all parameter names, that denote placeholders, in the file source code to obtain the number information of the placeholders in the slide to be identified;

when the feature information is the size information of the placeholders in the slide, the object feature information obtaining module comprises:

a size information obtaining sub-module, configured for searching for a parameter value corresponding to a parameter name relating to the size of each placeholder to obtain the size information of each placeholder in the slide to be identified;

when the feature information is the type information of the placeholders in the slide, the object feature information obtaining module comprises:

a type information obtaining sub-module, configured for determining a type of each parameter name, that denote a placeholder, in the file source code to obtain the type information of each placeholder in the slide to be identified;

when the feature information is the position information of the placeholders in the slide, the object feature information obtaining module comprises:

a position information obtaining sub-module, configured for determining a vertical distance from the top left corner of each placeholder to the left side of a baseplate of the slide and a vertical distance to the top side of the baseplate of the slide, and determining the two vertical distances as the position information of this placeholder in the slide;

when the feature information is the sequence information of the placeholders in the slide, the object feature information obtaining module comprises:

a sequence information obtaining sub-module, configured for adding a virtual two-dimensional rectangular plane coordinate system to the slide to be identified according to a preset rule; obtaining the position of the center point of each placeholder; drawing a straight line with a preset slope, through the center point of each placeholder, in the two-dimensional rectangular plane coordinate system, wherein the straight line intersects with the y-axis of the two-dimensional rectangular plane coordinate system at a point; determining the sequence of the placeholders according to ordinate values of intersection points on the y-axis, wherein the greater the ordinate value of an intersection point on the y-axis is, the smaller the sequence number of a placeholder will be, and if there are a plurality of straight lines corresponding to a plurality of placeholders intersect with y-axis at a same point, sequence numbers of the placeholders are determined in such a way that a sequence number of a placeholder on the left is smaller than a sequence number of a placeholder on the right; and obtaining the sequence information of each placeholder in the slide to be identified.

Preferably, the objects include placeholders, and the feature information of the objects comprises: connection elements between the placeholders, serial number elements corresponding to the placeholders, distances between the placeholders, and arrangement of the placeholders; and the slide layout determining module comprises:

a step-style layout determining sub-module, configured for determining the layout of the slide to be identified as a step-style layout, if there are directional connection elements between the placeholders and the connection elements point to a same direction; determining the layout of the slide to be identified as a step-style layout, if each of the placeholders has a corresponding serial number element;

a cycle-style layout determining sub-module, configured for determining the layout of the slide to be identified as a cycle-style layout, if there are directional connection elements between the placeholders and any placeholder has only one connection element pointing to it and one connection element that starts from it and points to another placeholder;

a summary-partition-style layout determining sub-module, configured for determining the layout of the slide to be identified as a summary-partition-style layout, if the distances from one placeholder to all the other placeholders are the same;

a comparison-style layout determining sub-module, configured for determining the layout of the slide to be identified as a comparison-style layout, if all the placeholders are arranged in a two-dimensional list;

a pyramid-style layout determining sub-module, configured for determining the layout of the slide to be identified as a pyramid-style layout, if all the placeholders are arranged in a triangle or trapezoid;

a tree-style layout determining sub-module, configured for determining the layout of the slide to be identified as a tree-style layout, if there are connection elements that connect one placeholder to a plurality of placeholders among all the placeholders;

a parallel-style layout determining sub-module, configured for determining the layout of the slide to be identified as a parallel-style layout, if the layout of the slide to be identified is not any one of a step-style layout, cycle-style layout, summary-partition-style layout, comparison-style layout, pyramid-style layout, and tree-style layout.

Preferably, the apparatus further includes:

a modification instruction receiving module, configured for receiving a modification instruction for the modified slide sent by the terminal device;

a thumbnail sending module, configured for sending thumbnails of a plurality of slide templates corresponding to the modification instruction to the terminal device;

an identification information receiving module, configured for receiving identification information of a slide template, that corresponds to a thumbnail selected by a user and is sent by the terminal device;

a second template sending module, configured for sending a slide template having the identification information to the terminal device, such that the terminal device copies the contents in each object in the modified slide to a corresponding object in the slide template having the identification information to obtain a modified slide.

The present application further provides an electronic device, comprising: a housing, a processor, a memory, a circuit board and a power supply circuit, wherein the circuit board is arranged inside a space enclosed by the housing, the processor and the memory are arranged on the circuit board; the power supply circuit is used to supply power for various circuits or means; the memory is used to store executable program code; and the processor executes a program corresponding to the executable program code by reading the executable program code stored on the memory for executing the method for identifying a slide provided by the embodiments of the present application.

An embodiment of the present application provides an application for performing the method for identifying a slide provided by the embodiments of the present application when being executed.

An embodiment of the present application provides a storage medium for storing executable program code, wherein the executable code is executed to implement the methods for identifying a slide provided by the embodiments of the present application.

It can be seen from the technical solution described above, the embodiments of the present application provide a method and an apparatus for identifying a slide, which are applied to an electronic device. The method includes: obtaining file source code of a slide to be identified, obtaining feature information of objects in the slide to be identified from the file source code, and determining a layout of the slide to be identified based on the obtained feature information. The embodiments of the present application can automatically obtain the feature information of the objects in the slide to be identified from the file source code containing the slide. Therefore, compared to the manual identification, the efficiency and accuracy of identifying the layout of the slide are significantly improved. Moreover, this makes it possible to perform subsequent automatic processes on the slide based on the layout of the slide.

BRIEF DESCRIPTION OF THE DRAWINGS

In order to more clearly describe the technical solution of the embodiments of the present application or of the prior art, drawings needed in the embodiments and the prior art will be briefly described below. Obviously, the drawings described below are for only some embodiments of the present application, one of ordinary skills in the art can also obtain other drawings based on these drawings without any creative efforts.

DETAILED DESCRIPTION

The technical solution of the present application will be described in detail with reference to the drawings of embodiments of the present application. Obviously, the embodiments described herein should be regarded as only a portion of the present invention. All other embodiments obtained by those of ordinary skills in the art based on the embodiments herein without any creative efforts are within the scope of the present application.

Figure 1:
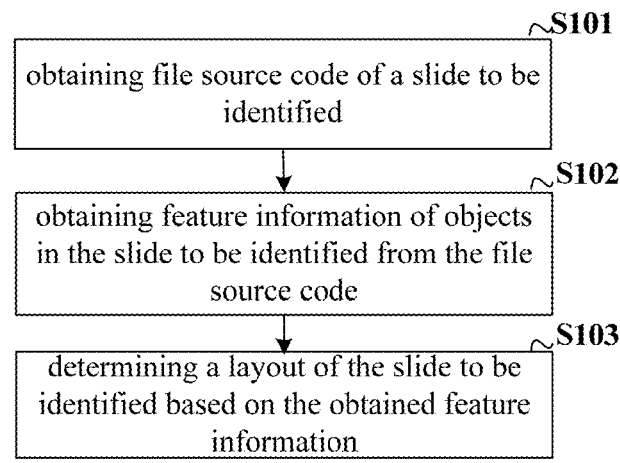
FIG. 1 is a schematic flowchart of a method for identifying a slide provided by a first embodiment of the present application.

FIG. 1 is a schematic flowchart of a method for identifying a slide provided by the first embodiment of the present application. The method is applicable in an electronic device, and may include the following steps:

S101: obtaining file source code of a slide to be identified.

S102: obtaining feature information of objects in the slide to be identified from the file source code.

Figure 2:
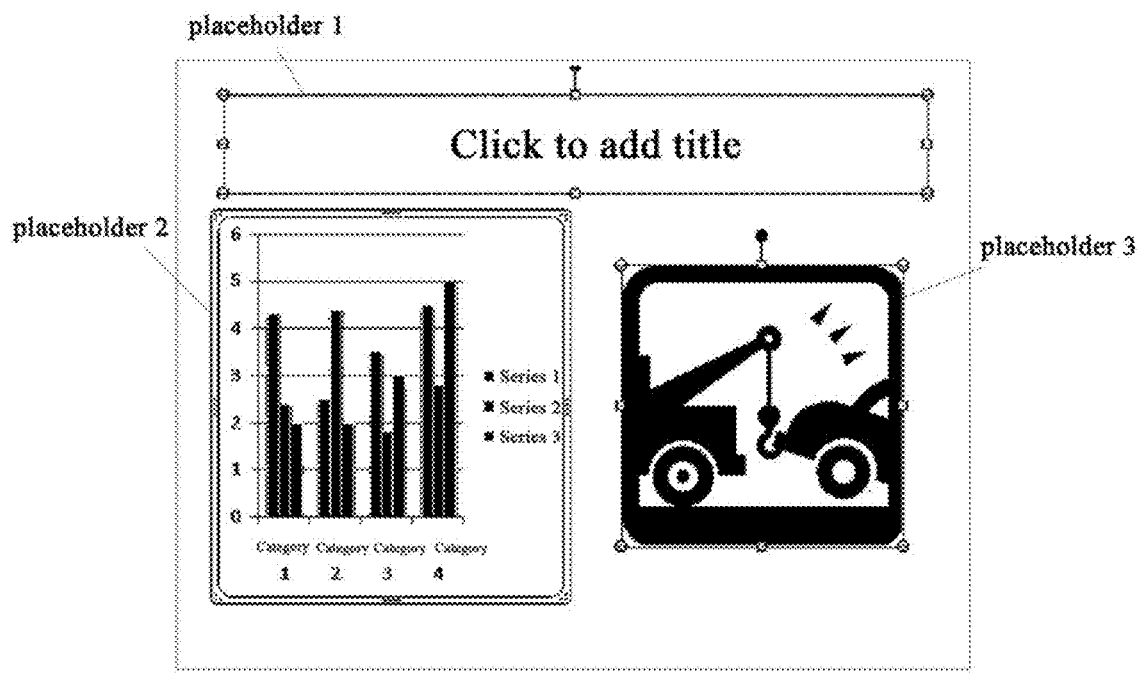
FIG. 2 is a schematic diagram of a slide to be identified provided by an embodiment of the present application.

The objects can include placeholders in the slide to be identified. The feature information of the objects can be information about the number, size, type, position, sequence and the like of the placeholders in the slide. As shown in FIG. 2, for example, there are three placeholders in the slide, i.e., placeholder 1, placeholder 2, and placeholder 3. The position information of the placeholder 1 is that: the distance in the horizontal direction from the top left corner of the placeholder 1 to the top left corner of the slide is 1.55 cm and the distance in the vertical direction to the top left corner of the slide is 0.99 cm; the type of the placeholder 1 is a plain text; and the size of the placeholder 1 is that the height is 3.18 cm and the width is 22.86 cm. The position information of the placeholder 2 is that the distance in the horizontal direction from the top left corner of the placeholder 2 to the top left corner of the slide is 1.39 cm and the distance in the vertical direction to the top left corner of the slide is 4.96 cm; the type of the placeholder 2 is a table; and the size of the placeholder 2 is that the height is 12.37 cm and the width is 11.22 cm. The position information of the placeholder 3 is that the distance in the horizontal direction from the top left corner of the placeholder 3 to the top left corner of the slide is 14.49 cm and the distance in the vertical direction to the top left corner of the slide is 6.55 cm; the type of the placeholder 3 is a picture; and the size of the placeholder 3 is that the height is 9.13 cm and the width is 9.14 cm.

The objects can also include text boxes, shapes, tables, and the like. The feature information of these objects can be obtained from the file source code.

The feature information of the objects can be obtained by the electronic device by reading the file source code of the slide.

The feature information of the objects obtained each time by the electronic device may vary depending on the user's instructions for modifying the slide, and is not limited to the feature information of the objects described above.

When the feature information is the number information of the placeholders in the slide, obtaining feature information of objects in the slide to be identified from the file source code may include:

finding all parameter names representing placeholders in the file source code to obtain the number information of the placeholders in the slide to be identified. Taking the slide shown in FIG. 2 as an example, it would found 3 parameter names representing placeholders in the file source code of the slide, thus the number of the placeholders is 3.

When the feature information is the size of the placeholders in the slide, obtaining feature information of objects in the slide to be identified from the file source code may include:

finding a parameter value, which relates to the size, corresponding to a parameter name of each placeholder to obtain the size information of each placeholder in the slide to be identified. For example, after a certain parameter name representing a placeholder is found, the size of the placeholder is determined by finding a keyword in the property code of the parameter name, for example, finding the parameter value corresponding to a keyword "width" or "height".

When the feature information is the type information of the placeholders in the slide, obtaining feature information of objects in the slide to be identified from the file source code may include:

determining a type of each parameter name representing a placeholder in the file source code to obtain the type information of each placeholder in the slide to be identified. For example, after a certain parameter name denoting a placeholder is found, a type parameter corresponding to the keyword "type" is searched in the property code of the parameter name. For example, the type of the placeholder is determined as "picture" if the type parameter is "picture"; and the type of the placeholder is determined as "table" if the type parameter is "table", and so on.

When the feature information is the position information of the placeholders in the slide, obtaining feature information of objects in the slide to be identified from the file source code may include:

determining a horizontal distance from the top left corner of each placeholder to the left side of a baseplate of the slide and a vertical distance to the top side of the baseplate of the slide, and determining the horizontal distance and the vertical distance as the position information of this placeholder in the slide. For example, as shown in FIG. 2, the position information of the placeholder 1 is that the distance in the horizontal direction from the top left corner of the placeholder 1 to the top left corner of the slide is 1.55 cm and the distance in the vertical direction to the top left corner of the slide is 0.99 cm; the position information of the placeholder 2 is that the distance in the horizontal direction from the top left corner of the placeholder 2 to the top left corner of the slide is 1.39 cm and the distance in the vertical direction to the top left corner of the slide is 4.96 cm; the position information of the placeholder 3 is that the distance in the horizontal direction from the top left corner of the placeholder 3 to the top left corner of the slide is 14.49 cm and the distance in the vertical direction to the top left corner of the slide is 6.55 cm.

Figure 3:
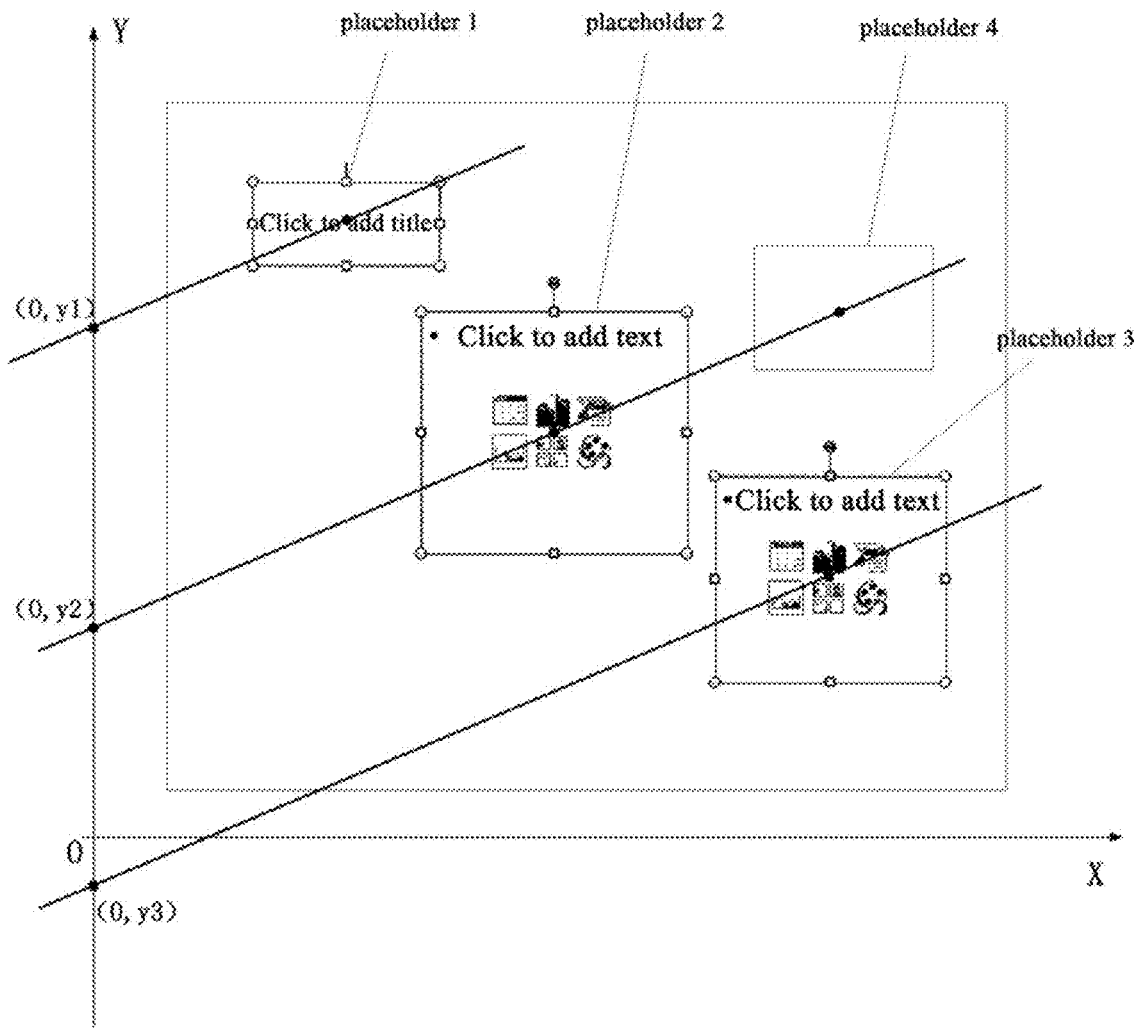
FIG. 3 schematically shows the determining of the sequence of placeholders in a slide according to an embodiment of the present application.

When the feature information is the sequence information of the placeholders in the slide, obtaining feature information of objects in the slide to be identified from the file source code may include:

adding a virtual two-dimensional rectangular plane coordinate system in the slide to be identified according to a preset rule; obtaining the position of the center point of each placeholder; drawing a straight line with a preset slope respectively through the center point of each placeholder in the two-dimensional rectangular plane coordinate system, wherein the straight lines respectively intersect with the y-axis of the two-dimensional rectangular plane coordinate system at a point; determining the sequence of the placeholders according to ordinate values of intersection points on the y-axis, and wherein the greater the ordinate value of an intersection point on the y-axis is, the smaller the sequence number of a placeholder will be; and if there are a plurality of straight lines corresponding to a plurality of placeholders intersect with the y-axis at a same point, sequence numbers of the placeholders are determined in such a way that a sequence number of a placeholder on the left is smaller than a sequence number of a placeholder on the right; and obtaining the sequence information of each placeholder in the slide to be identified. As shown in FIG. 3, in the rectangular plane coordinate system added to the slide, straight lines with a preset slope are drawn respectively through the center point of 4 placeholders, and the straight lines intersect respectively with the y-axis at point (0, y1), point (0, y2), point (0, y3), and point (0, y2). As y1>y2>y3, the placeholder 1 can be defined as the first placeholder in the sequence and the placeholder 3 can be defined as the fourth placeholder in the sequence. As the straight lines through the center points of placeholder 2 and placeholder 4 intersect with the y-axis at the same point (0, y2) and the placeholder 2 is on the left of the placeholder 4, the sequence number of the placeholder 2 is smaller than that of the placeholder 4. Therefore, the sequence number of the placeholder 1 is 1, the sequence number of the placeholder 2 is 2, the sequence number of the placeholder 3 is 4, and the sequence number of the placeholder 4 is 3.

S103: determining a layout of the slide to be identified based on the obtained feature information.

The layout of the slide is the arrangement and layout presented by the slide, which is determined from the feature information of the objects in the slide. For example, a picture-text-mixed layout indicates that there are a text object(s) and a picture object(s) in the slide, or a parallel-style layout indicates that the objects in the slide are arranged side by side in a plurality of rows or columns. A slide layout can contain a wide range of contents, and the specific contents contained in the layout and the meaning of the layout can be further determined according to specific needs for use.

In practical applications, the layout of the slide can be determined based on one or more of the number information of placeholders in the slide, size information of the placeholders in the slide, type information of the placeholders in the slide, position information of the placeholders in the slide and sequence information of the placeholders in the slide. For example, if it is detected that the number of placeholders in the slide to be identified is greater than 2 and the types of the placeholders are both of text type and picture type, it can be determined that the layout of the slide to be identified is a picture and text layout. For another example, the determined slide layout can be a parallel-style layout, step-style layout, comparison-style layout, and the like. If the electronic device detected that the number of placeholders in the slide to be identified is greater than 2 and the placeholders are horizontally or vertically symmetrically positioned, it can be determined that the layout of the slide to be identified is a parallel-style layout.

For another example, for a table, the determined slide layout can be a parallel-style layout, step-style layout, comparison-style layout, and the like. If the table contains only one row or one column and the contents in the table contain a serial number, it is determined that the layout of the slide is a step-style layout. The contents in the table can include a serial number and specific description text, and the serial number can be either a number input manually by a user or a number that is shown due to the cell in the table has a property set to item number. If the table contains only one row or one column and texts in the table are not serial numbers, it is determined that the layout of the slide is a parallel-style layout. If there are a plurality of titles in the first row or the first column in the table, it is determined that the layout of the slide is a comparison-style layout, wherein the method for determining a title include:

if cells of the first row or cells of the first column in the table are filled, for example, with color, texture, and the like, it is determined that the texts in the filled cells are titles; or, if the font size of texts in cells of the first row or in cells of the first column is greater than the font size of texts in cells of other rows or columns, it is determined that the texts in the cells of the first row or in the cells of the first column are titles; or, if the font style of texts (for example, such as bold or italic) in cells of the first row or in cells of the first column is different from the font style of texts in cells of other rows or columns, it is determined that the texts in the cells of the first row or in the cells of the first column are titles.

The embodiment of the present application obtains source code of a slide document, reads feature information of the objects from the file source code, and determines a layout of the slide based on the feature information, which realizes automatic identification of the layout of a slide and solves the problem that it is inefficient to manually identify the layout of a slide.

The feature information of the objects can include: connection elements between the placeholders, serial number elements corresponding to the placeholders, distances between the placeholders, and arrangement of the placeholders.

Figure 4A:
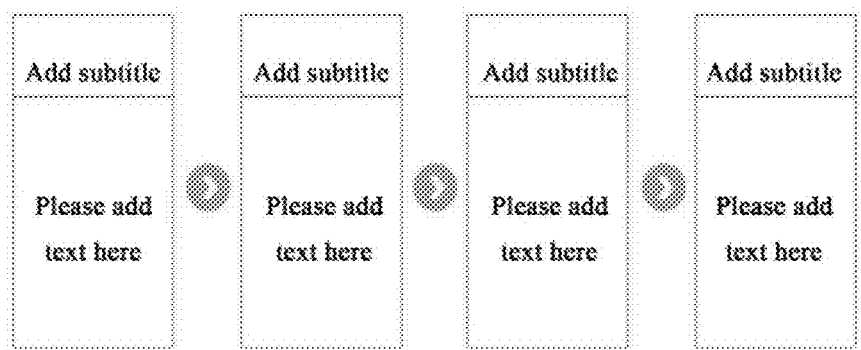
FIG. 4A is a schematic diagram of a step-style layout provided by an embodiment of the present application.
Figure 4B:
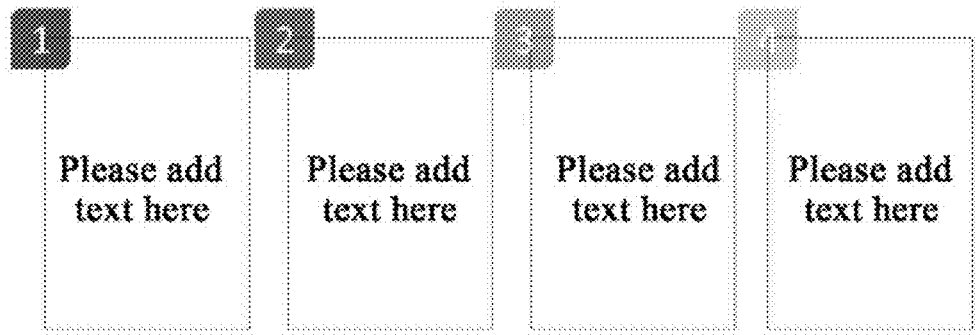
FIG. 4B is a schematic diagram of another step-style layout provided by an embodiment of the present application.
Figure 4C:
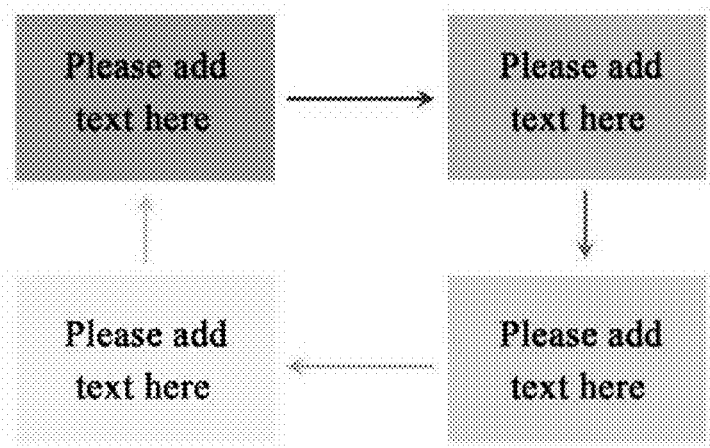
FIG. 4C is a schematic diagram of a cycle-style layout provided by an embodiment of the present application.
Figure 4D:
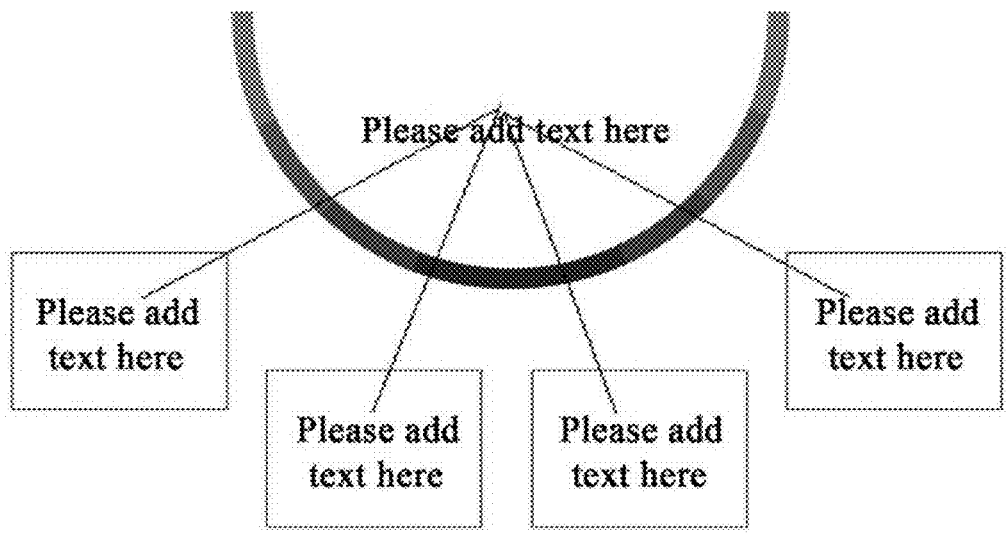
FIG. 4D is a schematic diagram of a summary-partition-style layout provided by an embodiment of the present application.
Figures 4E, 4F:
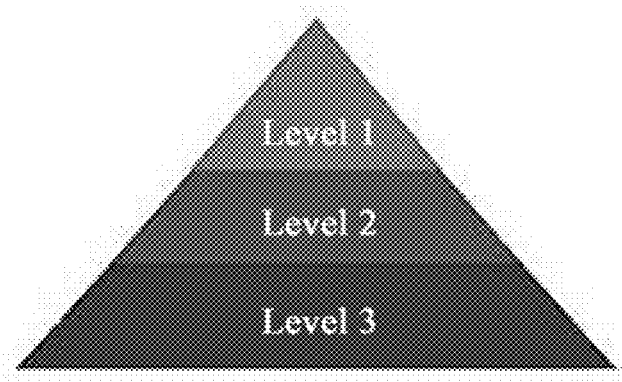
FIG. 4E is a schematic diagram of a pyramid-style layout provided by an embodiment of the present application.
FIG. 4F is a schematic diagram of a comparison-style layout provided by an embodiment of the present application.
Figure 4G:
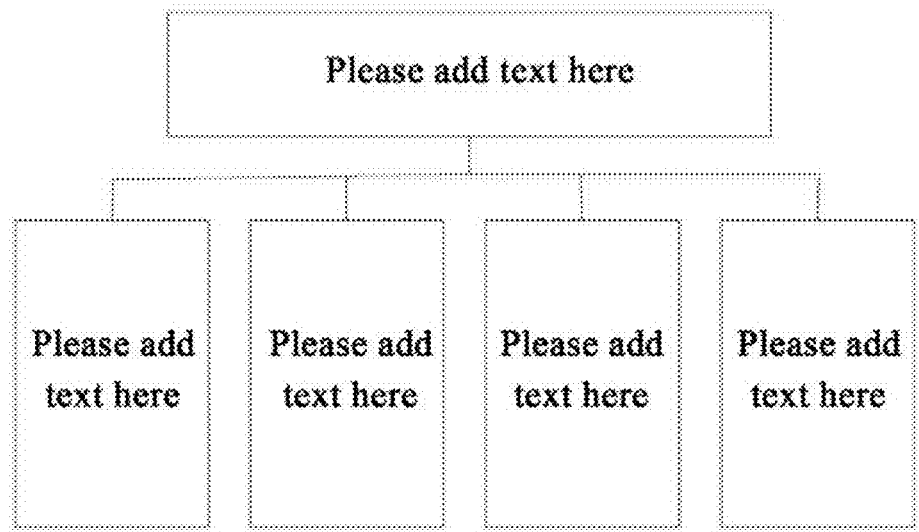
FIG. 4G is a schematic diagram of a tree-style layout provided by an embodiment of the present application.
Figure 4H:
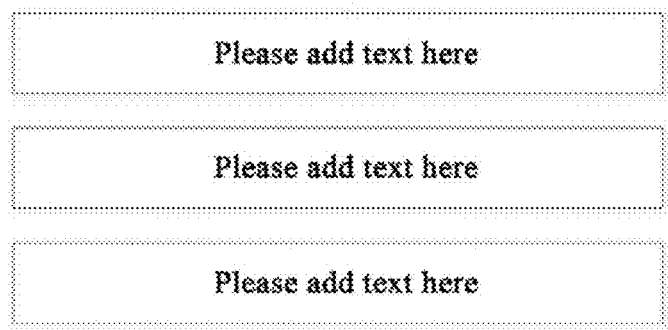
FIG. 4H is a schematic diagram of a parallel-style layout provided by an embodiment of the present application.

The step S103 can include:

determining that the layout of the slide to be identified is a step-style layout, if there are directional connection elements between the placeholders and the directivities of the connection elements are the same; FIG. 4A shows a schematic diagram of a step layout of a slide that has directional connection elements directing to a same direction;

determining that the layout of the slide to be identified is a step-style layout, if each of the placeholders has a corresponding serial number element; FIG. 4B shows a schematic diagram of a step layout of a slide with corresponding serial number elements;

determining that the layout of the slide to be identified is a cycle-style layout, if there are directional connection elements between the placeholders and any of the placeholders has only one connection element directing to that placeholder and one connection element that originates from that placeholder and directs to another placeholder; FIG. 4C shows a schematic diagram of a cycle layout of a slide;

determining that the layout of the slide to be identified is a summary-partition-style layout, if the distances from one placeholder to all the other placeholders are the same; FIG. 4D shows a schematic diagram of a summary-breakdown layout of a slide;

determining that the layout of the slide to be identified is a comparison-style layout, if all the placeholders are arranged in a two-dimensional list; FIG. 4F shows a schematic diagram of a compare layout of a slide;

determining that the layout of the slide to be identified is a pyramid-style layout, if all the placeholders are arranged in a triangle or trapezoid; FIG. 4E shows a schematic diagram of a pyramid layout of a slide;

determining that the layout of the slide to be identified is a tree-style layout, if there are connection elements that originate from a same placeholder and respectively direct to different placeholders; FIG. 4G shows a schematic diagram of a tree layout of a slide;

determining that the layout of the slide to be identified is a parallel-style layout, if the layout of the slide to be identified is not any one of the step-style layout, cycle-style layout, summary-partition-style layout, comparison-style layout, pyramid-style layout, and tree-style layout; FIG. 4H shows a schematic diagram of a parallel layout of a slide.

In some specific embodiments, the electronic device is a server, which can locally store slide templates having a plurality of layouts. The server can utilize the method according to the first embodiment of the present application, search for a slide template having the determined layout in the slide templates locally stored, and can send the template to a terminal device. On the basis of the method illustrated by the first embodiment of the present application, the electronic device is a server, which stores slide templates having a plurality of layouts, and the server can send the slide templates to a terminal device. The method shown in FIG. 1 can further include:

finding a slide template with a determined layout in the server;

sending the found slide template to the terminal device such that the terminal device copies contents of each of the objects in the slide to be identified to a corresponding object in the received slide template to obtain a modified slide.

Figure 5:
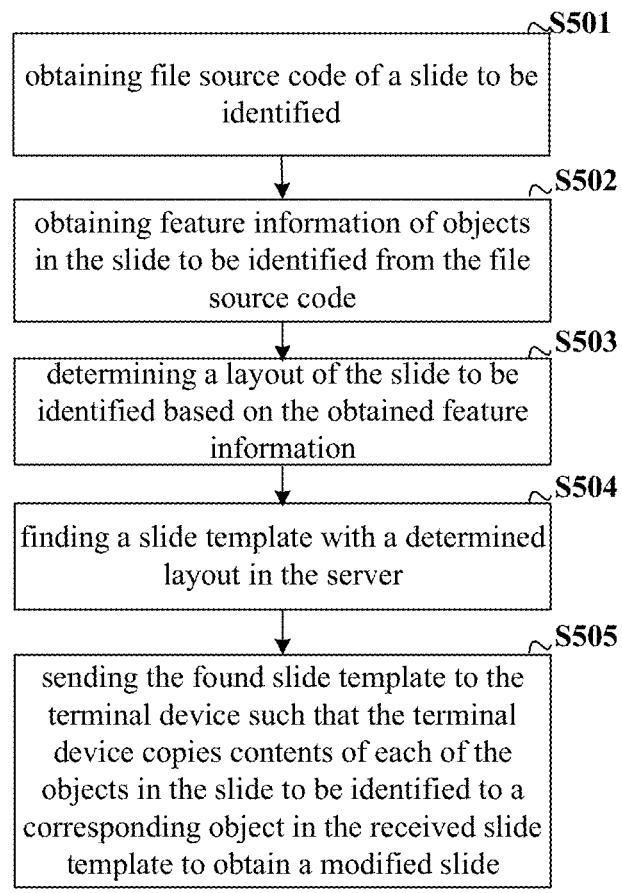
FIG. 5 is a schematic flowchart of a method for identifying a slide provided by a second embodiment of the present application.

FIG. 5 is a schematic flowchart of a method for identifying a slide provided by a second embodiment of the present application. On the basis of the steps illustrated by the first embodiment, the electronic device is a terminal device that stores slide templates with a plurality of layouts. The server can utilize the method according to the first embodiment of the present application, to find a slide template with a determined layout in the slide templates locally stored, and can send the template to a terminal device. The method can include following steps:

S501: obtaining file source code of a slide to be identified;

S502: obtaining feature information of objects in the slide to be identified from the file source code;

S503: determining a layout of the slide to be identified based on the obtained feature information; and S504: finding a slide template with a determined layout in the server.

The feature information of the objects in the slide to be identified is compared with feature information of objects in the slide templates having a plurality of layouts to determine a slide template matching the slide to be identified.

The server can identify feature information of objects in the slide template, and compare this feature information with the feature information of the objects in the slide to be identified according to a preset matching scheme to obtain a matching slide template.

The objects can include placeholders, and the feature information of the objects in the slide to be identified includes at least one of the: number information of the placeholders in the slide, size information of the placeholders in the slide, type information of the placeholders in the slide, position information of the placeholders in the slide, sequence information of the placeholders in the slide. The step S504 can include the step a to step e:

step a, comparing the number of the placeholders in the slide to be identified with the number of placeholders in each slide template to obtain slide templates having placeholders the number of which is the same as the number of placeholders in the slide to be identified;

step b, comparing the size of the placeholders in the slide to be identified with the size of the placeholders having a same sequence number in the obtained slide templates to obtain a size comparison result;

step c, comparing the type of the placeholders in the slide to be identified with the type of the placeholders having a same sequence number in the obtained slide templates to obtain a type comparison result;

step d, comparing the position information of the placeholders in the slide to be identified with the position information of the placeholders having a same sequence number in the obtained slide templates to obtain a position information comparison result;

step e, evaluating each slide template obtained according to the size comparison result, the type comparison result, and the position information comparison result, and determining a slide template having a score that meets a preset score condition as a slide template matching the slide to be identified.

There can be one or more slide templates that meet the preset score condition.

S505: sending the found slide template to the terminal device such that the terminal device copies contents of each of the objects in the slide to be identified to a corresponding object in the received slide template to obtain a modified slide.

After having received the slide template sent by the server, the terminal device copies the contents in each of the objects in the slide to be identified to an object, having a same sequence number, in the slide template matching the slide to be identified to obtain a modified slide.

Figure 6A:
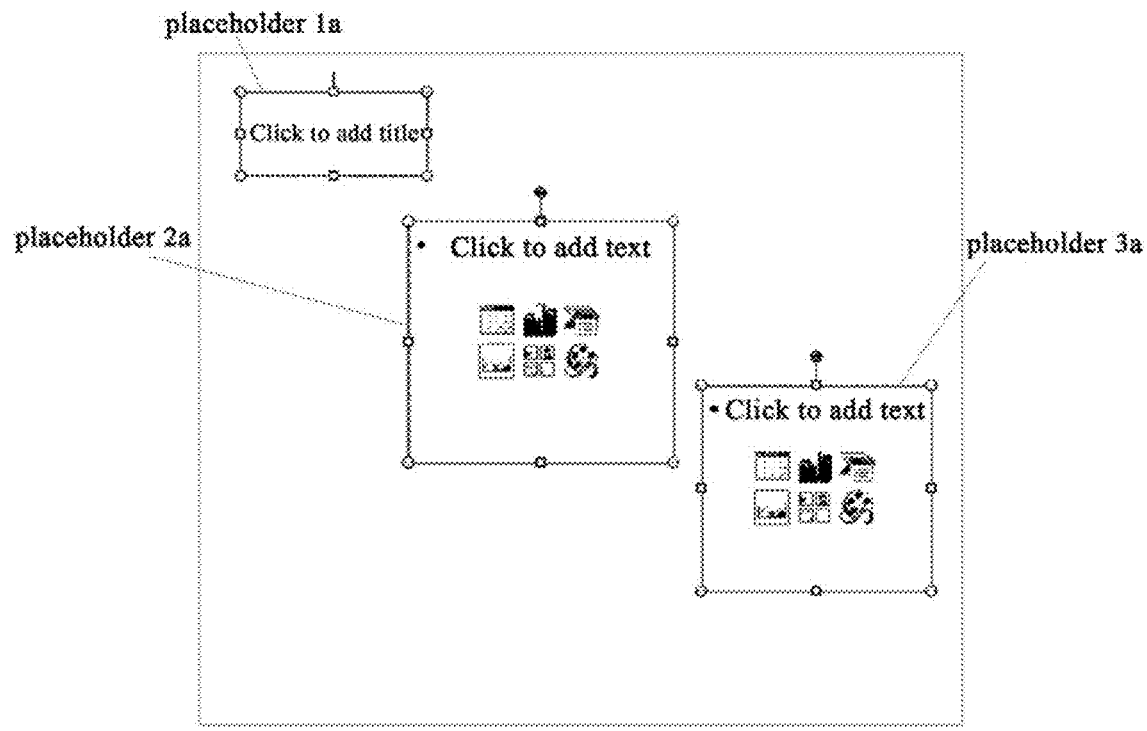
FIG. 6A is a schematic diagram of a slide template provided by an embodiment of the present application.
Figure 6B:
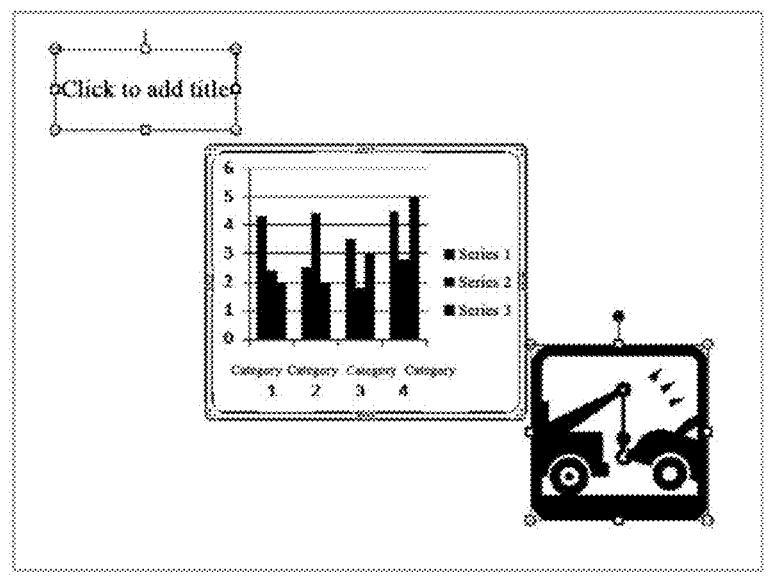
FIG. 6B is a schematic diagram of a modified slide obtained by copying the contents in the placeholders in the slide shown in FIG. 2 to the slide template shown in FIG. 6A.

For example, FIG. 2 shows a slide to be identified, and FIG. 6A shows a slide template matching the slide to be identified. In the slide shown in FIG. 2, the objects are placeholders. According to the method for determining the sequence of placeholders, the sequence number of the placeholder 1 is 1, the sequence number of the placeholder 2 is 2, and the sequence number of the placeholder 3 is 3. In the slide shown in FIG. 6A, the sequence number of the placeholder 1a is 1, the sequence number of the placeholder 2a is 2, and the sequence number of the placeholder 3a is 3. The contents in the placeholders in the slide shown in FIG. 2 are copied to the slide template shown in FIG. 6A, that is, the contents in placeholders shown in FIG. 2 are copied to placeholders with a same sequence number shown in FIG. 6A, to obtain a modified slide as shown in FIG. 6B.

In the embodiment of the present application, the electronic device is a terminal device that stores slide templates with a plurality of layouts. After having identified the layout of the slide to be identified, the server finds a template with a identified slide layout in the slide templates, and sends the template to the terminal device such that the terminal device performs a replacement of contents of placeholders, which improves the efficiency of identifying and using a slide layout.

In some specific embodiments, the electronic device is a terminal device, which can locally store slide templates having a plurality of layouts. The terminal device can utilize the method according to the first embodiment of the present application, search for a slide template having the determined layout in the slide templates locally stored, and copy the contents in the objects in the slide to be identified to corresponding objects in the slide template. On the basis of the method illustrated by the first embodiment of the present application, the electronic device is a terminal device, which stores slide templates having a plurality of layouts. The method shown in FIG. 1 can further include:

finding a slide template with a determined layout in the terminal device;

copying contents in each of the objects in the slide to be identified to a corresponding object in the slide template to obtain a modified slide.

Figure 7:
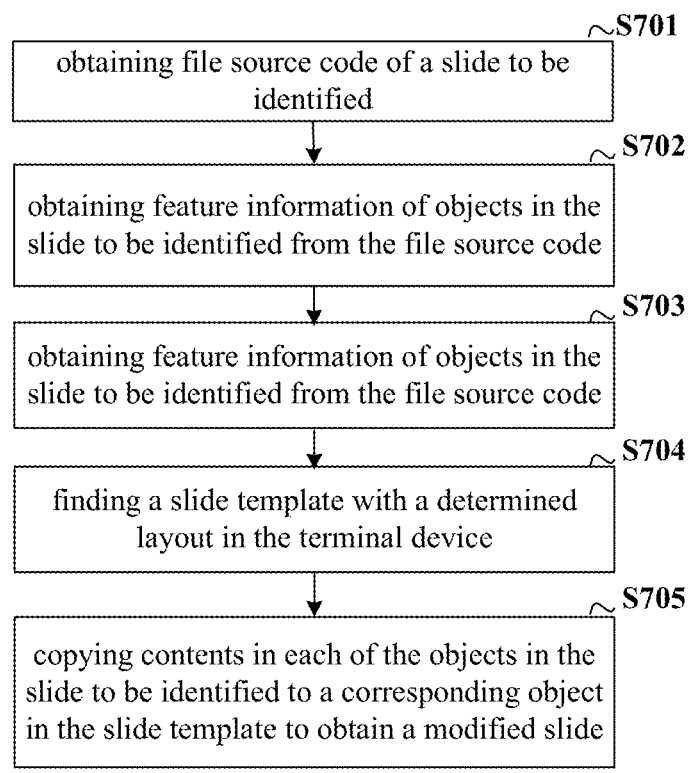
FIG. 7 is a schematic flowchart of a method for identifying a slide provided by a third embodiment of the present application.

FIG. 7 is a schematic flowchart of a method for identifying a slide provided by a third embodiment of the present application. On the basis of the steps illustrated by the first embodiment, the electronic device is a terminal device, which can locally store slide templates with a plurality of layouts. The terminal device can utilize the method according to the first embodiment of the present application, find a slide template with a determined layout in the slide templates locally stored, and copy the contents in the objects in the slide to be identified to corresponding objects in the slide template. The method can include following steps:

S701: obtaining file source code of a slide to be identified;

S702: obtaining feature information of objects in the slide to be identified from the file source code;

S703: obtaining feature information of objects in the slide to be identified from the file source code;

S704: finding a slide template with a determined layout in the terminal device;

S705: copying contents in each of the objects in the slide to be identified to a corresponding object in the slide template to obtain a modified slide.

In an embodiment of the present application, the electronic device is a terminal device, which stores slide templates having a plurality of layouts. After having identified the layout of the slide to be identified, the terminal device searches for a template having the identified slide layout in the slide templates, and copies the contents in the objects in the slide to be identified to the template, which improves the efficiency of identifying and using a slide layout.

In other specific embodiments, the electronic device is a server, which can further store thumbnails of the slide templates. After the modified slide is obtained, the terminal device can further send a modification instruction for the modified slide to the server. On the basis of the method illustrated by the second embodiment of the present application, the method shown in FIG. 5 can further include following steps:

receiving, from the terminal device, a modification instruction for the modified slide;

sending thumbnails of a plurality of slide templates corresponding to the modification instruction to the terminal device;

receiving, from the terminal device, identification information of a slide template that corresponds to a thumbnail selected by a user;

sending a slide template having the identification information to the terminal device, such that the terminal device copies the contents in each object in the modified slide to a corresponding object in the slide template with the identification information to obtain a modified slide.

Figure 8:
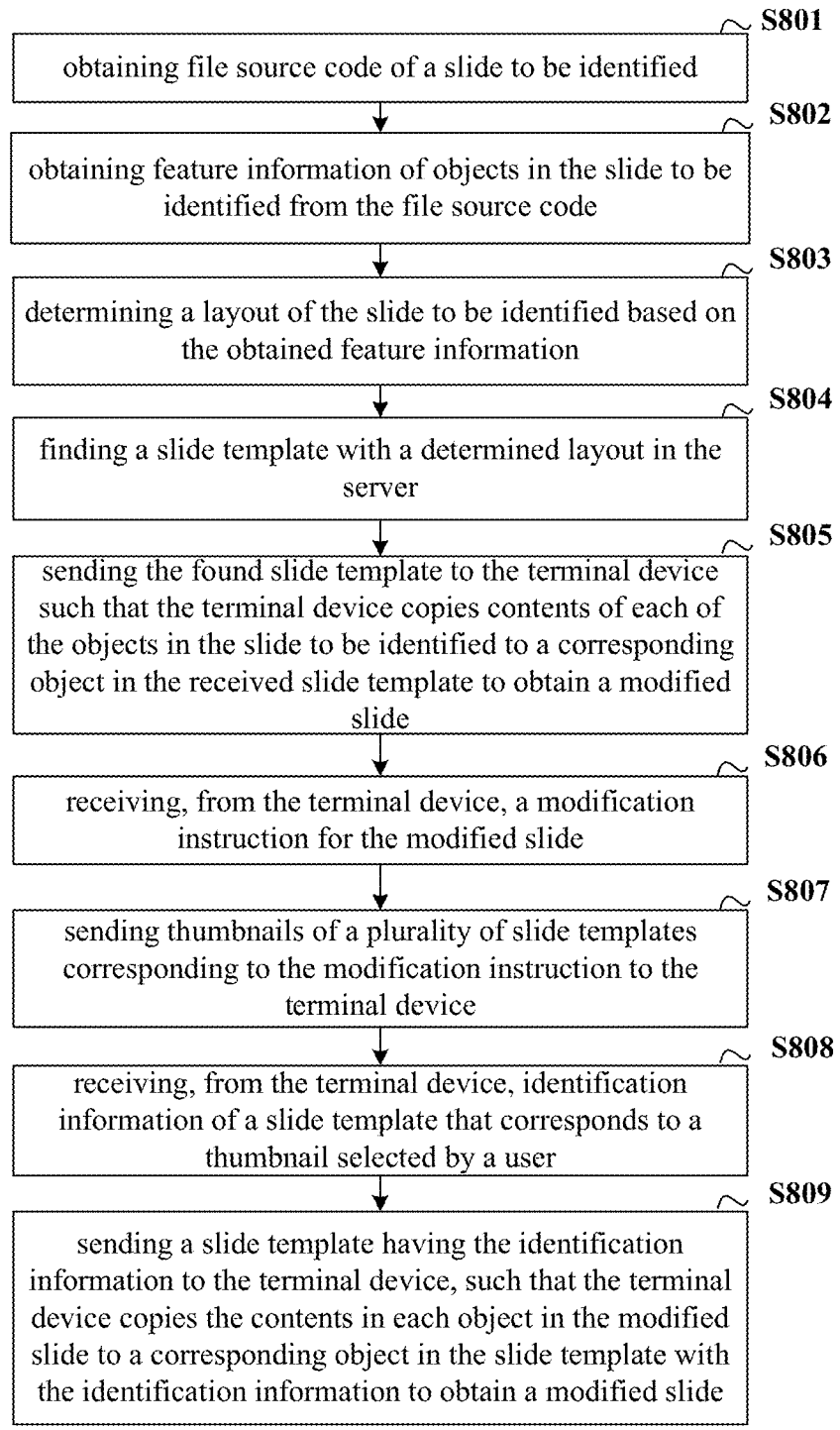
FIG. 8 is a schematic flowchart of a method for identifying a slide provided by a fourth embodiment of the present application.

FIG. 8 is a schematic flowchart of a method for identifying a slide provided by a fourth embodiment of the present application. On the basis of the steps illustrated by the second embodiment, the server can further store thumbnails of the slide templates. After the modified slide is obtained, the terminal device can further send a modification instruction for the modified slide to the server. The method can include following steps:

S801: obtaining file source code of a slide to be identified;

S802: obtaining feature information of objects in the slide to be identified from the file source code;

S803: determining a layout of the slide to be identified based on the obtained feature information;

S804: finding a slide template with a determined layout in the server;

S805: sending the found slide template to the terminal device such that the terminal device copies contents of each of the objects in the slide to be identified to a corresponding object in the received slide template to obtain a modified slide.

S806: receiving, from the terminal device, a modification instruction for the modified slide.

The modification instruction contains relevant feature information of the objects in the modified slide. For example, in the case where the objects are placeholders, if only the number of the placeholders in the modified slide is to be modified, the modification instruction can contain the layout and the type information of the placeholders in the modified slide, in order for the server to locally search for a slide template in the slide templates, in which the layout and type information of the placeholders are the same as those of the modified slide and only the number of placeholders is different, and send the slide template to the terminal device.

For another example, in the case where the objects are placeholders, if only the layout of the placeholders in the modified slide is to be modified, the modification instruction can contain the number and the type information of the placeholders in the modified slide, in order for the server to locally search in a template library for a slide template in the slide templates, in which the number and the type information of the placeholders are the same as those of the modified slide and only the layout of the placeholders is different, and send the slide template to the terminal device. The layout of a placeholder described herein refers to the appearance style of the placeholder, such as a round style, lace border style, and the like.

S807: sending thumbnails of a plurality of slide templates corresponding to the modification instruction to the terminal device.

Figure 9:
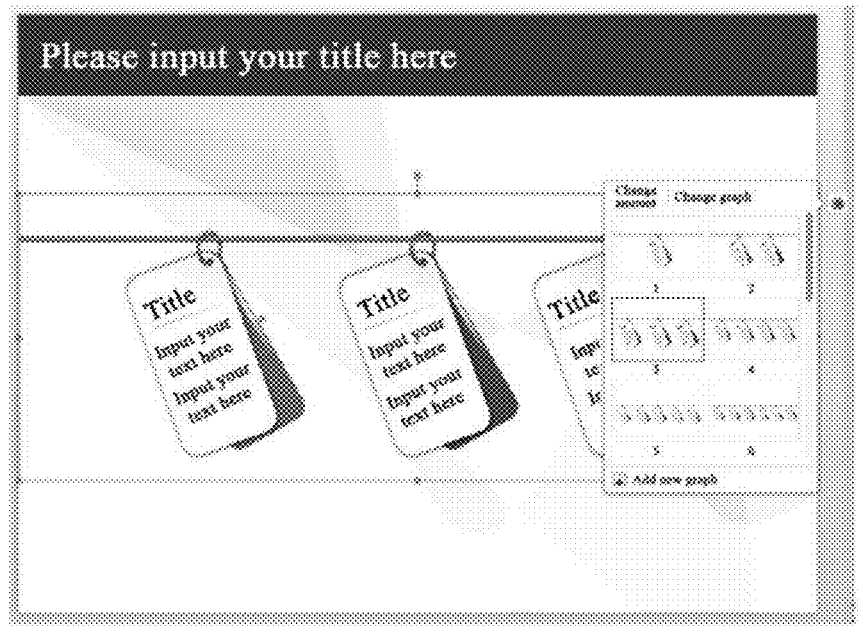
FIG. 9 is a schematic diagram of a slide after the terminal device has received a plurality of thumbnails, sent by a server, of slide templates with only the number of placeholders changed.

For example, the objects are placeholders, as shown in FIG. 9. After sending an instruction for only changing the number of placeholders to the server, the terminal device receives thumbnails of a plurality of slide templates with different numbers of placeholders sent by the server; and a user can click a thumbnail of a slide template according to his/her needs to select a desired slide template.

Figure 10:
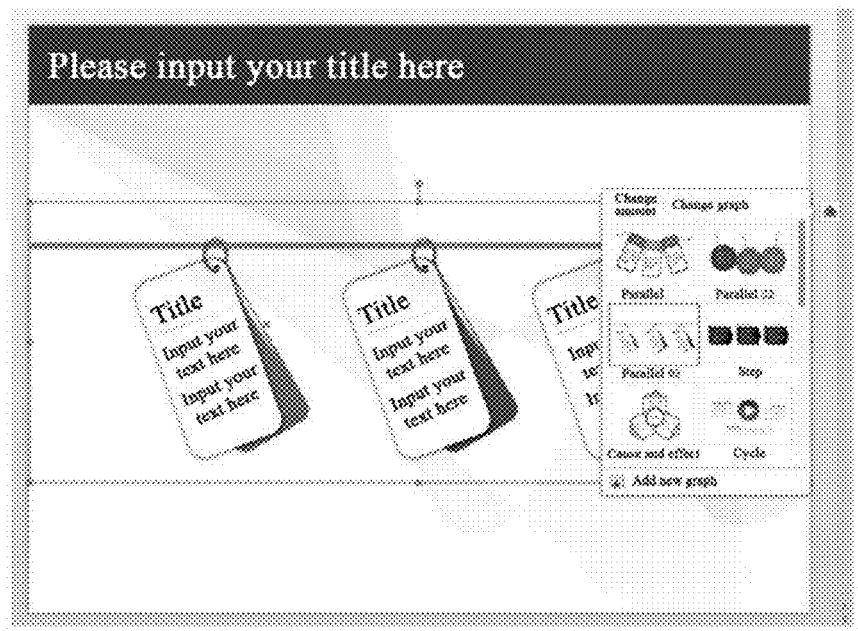
FIG. 10 is a schematic diagram of a slide after the terminal device has received a plurality of thumbnails, sent by a server, of slide templates with only the layouts of placeholders changed.

For another example, the objects are placeholders, as shown in FIG. 10. After sending an instruction for only changing the layout of placeholders to the server, the terminal device receives thumbnails of a plurality of slide templates having placeholders with a different layout sent by the server; and a user can click a thumbnail of a slide template according to his/her needs to select a desired slide template. The layout of a placeholder described herein refers to the appearance style of the placeholder, such as a round style, lace border style, and the like.

S808: receiving, from the terminal device, identification information of a slide template that corresponds to a thumbnail selected by a user.

The identification information of the slide template is the identification information of the slide template in the server. The server can find the corresponding template based on the identification information. The identification information is sent by the server to the terminal device along with thumbnails of the relevant slide templates.

S809: sending a slide template having the identification information to the terminal device, such that the terminal device copies the contents in each object in the modified slide to a corresponding object in the slide template with the identification information to obtain a modified slide.

In an embodiment of the present application, the electronic device is a server, which can receive the modification instruction for the modified slide sent by the terminal device, send thumbnails of relevant slide templates to the terminal device according to the modification instruction, and send a corresponding slide template to the terminal device based on the selection of a thumbnail by the terminal device, which further improves the efficiency of identifying and using a slide layout.

The embodiment of the present application provides a method for identifying a slide, which is applied to an electronic device. The method includes: obtaining file source code of a slide to be identified, obtaining feature information of objects in the slide to be identified from the file source code, and determining a layout of the slide to be identified based on the obtained feature information. The embodiment of the present application can automatically obtain the feature information of the objects in the slide to be identified from the file source code containing the slide. Therefore, compared to the manual identification, the efficiency and accuracy of identifying the layout of the slide are significantly improved. Moreover, this makes it possible to perform subsequent automatic processes on the slide based on the layout of the slide.

Corresponding to the method shown in FIG. 1, the present application further provides an apparatus for identifying a slide.

Figure 11:
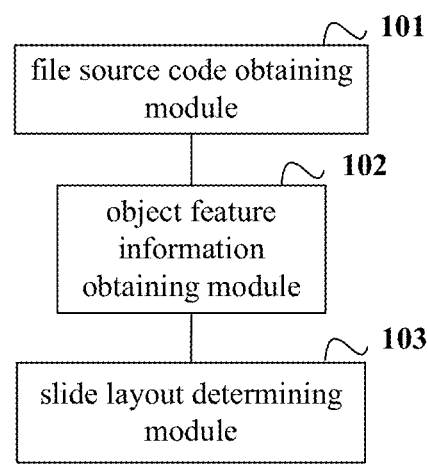
FIG. 11 is a schematic structure of an apparatus for identifying a slide provided by an embodiment of the present application.

FIG. 11 is a schematic structure of an apparatus for identifying a slide provided by an embodiment of the present application. The apparatus is applied to an electronic device, and the apparatus can include: a file source code obtaining module 101, an object feature information obtaining module 102, and a slide layout determining module 103.

The file source code obtaining module 101 is configured for obtaining file source code of a slide to be identified.

The object feature information obtaining module 102 is configured for obtaining feature information of objects in the slide to be identified from the file source code.

The slide layout determining module 103 is configured for determining a layout of the slide to be identified based on the obtained feature information.

Further, the electronic device is a server that stores slide templates with a plurality of layouts and is able to send the slide templates to a terminal device, and the apparatus can further include a first finding module and a first template sending module.

The first finding module (not shown in the figure) is configured for finding a slide template with a determined layout in the electronic device.

The first template sending module (not shown in the figure) is configured for sending the found slide template to the terminal device such that the terminal device copies the contents in each object in the slide to be identified to a corresponding object in the received slide template to obtain a modified slide.

Further, the electronic device is a terminal device that stores slide templates with a plurality of layouts, and the apparatus can further include: a second finding module and a content copying module.

The second finding module (not shown in the figure) is configured for finding a slide template with a determined layout in the terminal device.

The content copying module (not shown in the figure) is configured for copying contents in each of the objects in the slide to be identified to a corresponding object in the slide template to obtain a modified slide.

Further, the feature information of the objects in the slide to be identified can include at least one of: number information of the placeholders in the slide, size information of the placeholders in the slide, type information of the placeholders in the slide, position information of the placeholders in the slide, and sequence information of the placeholders in the slide.

When the feature information is the number information of the placeholders in the slide, the object feature information obtaining module 102 can include:

a number information obtaining sub-module (not shown in the figure), configured for finding all parameter names representing placeholders in the file source code to obtain the number information of the placeholders in the slide to be identified.

When the feature information is the size information of the placeholders in the slide, the object feature information obtaining module 102 can include:

a size information obtaining sub-module (not shown in the figure), configured for finding a parameter value, which relates to the size, corresponding to a parameter name of each placeholder to obtain the size information of each placeholder in the slide to be identified.

When the feature information is the type information of the placeholders in the slide, the object feature information obtaining module 102 can include:

a type information obtaining sub-module (not shown in the figure), configured for determining a type of each parameter name representing a placeholder in the file source code to obtain the type information of each placeholder in the slide to be identified.

When the feature information is the position information of the placeholders in the slide, the object feature information obtaining module 102 can include:

a position information obtaining sub-module (not shown in the figure), configured for determining, from the file source code, a horizontal distance from the top left corner of each placeholder to the left side of a baseplate of the slide and a vertical distance to the top side of the baseplate of the slide, and determining the horizontal distance and the vertical distance as the position information of this placeholder in the slide.

When the feature information is the sequence information of the placeholders in the slide, the object feature information obtaining module 102 can include:

a sequence information obtaining sub-module (not shown in the figure), configured for adding, according to a preset rule, a virtual two-dimensional rectangular plane coordinate system in the slide to be identified; obtaining the position of the center point of each placeholder; drawing straight lines with a preset slope respectively through the center points of the placeholders in the two-dimensional rectangular plane coordinate system, wherein each of the straight lines intersects with the y-axis of the two-dimensional rectangular plane coordinate system at a point; determining the sequence of the placeholders according to ordinate values of intersection points on the y-axis, and wherein the greater the ordinate value of an intersection point on the y-axis is, the smaller the sequence number for the corresponding placeholder will be, and if there are a plurality of straight lines corresponding to a plurality of placeholders intersect with y-axis at a same point, sequence numbers of the placeholders are determined in such a way that a sequence number of a placeholder on the left is smaller than a sequence number of a placeholder on the right; and obtaining the sequence information of each placeholder in the slide to be identified.

Further, the feature information of the objects can include: connection elements between the placeholders, serial number elements corresponding to the placeholders, distances between the placeholders, and arrangement of the placeholders, and the slide layout determining module 103 can include:

a step-style layout determining sub-module (not shown in the figure), configured for determining that the layout of the slide to be identified is a step-style layout, if there are directional connection elements between the placeholders and the directivities of the connection elements are the same, determining that the layout of the slide to be identified is a step-style layout, if each of the placeholders has a corresponding serial number element;

a cycle-style layout determining sub-module (not shown in the figure), configured for determining that the layout of the slide to be identified is a cycle-style layout, if there are directional connection elements between the placeholders and any of the placeholders has only one connection element directing to that placeholder and one connection element that originates from that placeholder and directs to another placeholder;

a summary-partition-style layout determining sub-module (not shown in the figure), configured for determining that the layout of the slide to be identified is a summary-partition-style layout, if the distances from one placeholder to all the other placeholders are the same;

a comparison-style layout determining sub-module (not shown in the figure), configured for determining that the layout of the slide to be identified is a comparison-style layout, if all the placeholders are arranged in a two-dimensional list;

a pyramid-style layout determining sub-module (not shown in the figure), configured for determining that the layout of the slide to be identified is a pyramid-style layout, if all the placeholders are arranged in a triangle or trapezoid;

a tree-style layout determining sub-module (not shown in the figure), configured for determining that the layout of the slide to be identified is a tree-style layout, if there are connection elements that originate from a same placeholder and respectively direct to different placeholders;

a parallel-style layout determining sub-module (not shown in the figure), configured for determining that the layout of the slide to be identified is a parallel-style layout, if the layout of the slide to be identified is not any one of the step-style layout, cycle-style layout, summary-partition-style layout, comparison-style layout, pyramid-style layout, and tree-style layout.

Further, the apparatus can further include: a modification instruction receiving module, a thumbnail sending module, an identification information receiving module, and a second template sending module.

The modification instruction receiving module (not shown in the figure) is configured for receiving, from the terminal device, a modification instruction for the modified slide.

The thumbnail sending module (not shown in the figure) is configured for sending thumbnails of a plurality of slide templates corresponding to the modification instruction to the terminal device.

The identification information receiving module (not shown in the figure) is configured for receiving, from the terminal device, identification information of a slide template that corresponds to a thumbnail selected by a user.

The second template sending module (not shown in the figure) is configured for sending a slide template having the identification information to the terminal device, such that the terminal device copies the contents in each object in the modified slide to a corresponding object in the slide template with the identification information to obtain a modified slide.

The embodiment of the present application provides an apparatus for identifying a slide, which is applied in an electronic device. The apparatus can obtain file source code of a slide to be identified, obtain feature information of objects in the slide to be identified from the file source code, and determine a layout of the slide to be identified according to the obtained feature information. The embodiment of the present application can automatically obtain the feature information of the objects in the slide to be identified from the file source code containing the slide. Therefore, compared to the manual identification, the efficiency and accuracy of identifying the layout of the slide are significantly improved. Moreover, this makes it possible to perform subsequent automatic processes on the slide based on the layout of the slide.

An embodiment of the present application further provides an electronic device including: a housing, a processor, a memory, a circuit board and a power supply circuit. The circuit board is arranged inside a space enclosed by the housing, the processor and the memory are arranged on the circuit board; the power supply circuit is used to supply power for various circuits or means; the memory is configured to store executable program code; and the processor executes a program corresponding to the executable program code by reading the executable program code stored on the memory for executing the method for identifying a slide provided by the embodiments of the present application, wherein the method can include:

obtaining file source code of a slide to be identified;

obtaining feature information of objects in the slide to be identified from the file source code; and determining a layout of the slide to be identified based on the obtained feature information.

The embodiment of the present invention obtains file source code of a slide, reads feature information of the objects from the file source code, and determines a layout of the slide based on the feature information, which realizes automatic identification of the layout of a slide and solves the problem that it is inefficient to manually identify the layout of a slide.

An embodiment of the present application provides an application for carrying out the method for identifying a slide provided by the embodiments of the present application when being executed. The method for identifying a slide can include:

obtaining file source code of a slide to be identified;

obtaining feature information of objects in the slide to be identified from the file source code; and determining a layout of the slide to be identified based on the obtained feature information.

The embodiment of the present invention obtains file source code of a slide, reads feature information of the objects from the file source code, and determines a layout of the slide based on the feature information, which realizes automatic identification of the layout of a slide and solves the problem that it is inefficient to manually identify the layout of a slide.

An embodiment of the present application provides a storage medium for storing executable program code, which are executed to implement the methods for identifying a slide provided by the embodiments of the present application. The method for identifying a slide can include:

obtaining file source code of a slide to be identified;

obtaining feature information of objects in the slide to be identified from the file source code; and determining a layout of the slide to be identified based on the obtained feature information.

The embodiment of the present invention obtains file source code of a slide, reads feature information of the objects from the file source code, and determines a layout of the slide based on the feature information, which realizes automatic identification of the layout of a slide and solves the problem that it is inefficient to manually identify the layout of a slide.

It should be noted that the relationship terms herein such as "first", "second" and the like, if any, are only used for distinguishing one entity or operation from another entity or operation, but do not necessarily require or imply that there is any actual relationship or order between these entities or operations. Moreover, the terms "include", "comprise" or any other variants thereof are intended to cover non-exclusive inclusions, so that processes, methods, articles or devices comprising a series of elements comprise not only those elements listed but also those not specifically listed or the elements intrinsic to these processes, methods, articles, or devices. Without further limitations, elements defined by the sentences "comprise(s) a." or "include(s) a." do not exclude that there are other identical elements in the processes, methods, articles, or devices that include these elements.

All the embodiments are described in corresponding ways, same or similar parts in each of the embodiments can be referred to one another, and the parts emphasized are differences to other embodiments. For embodiments of the apparatus, electronic device, application program and storage medium, since they are similar to the embodiments of the method, the description thereof is relatively simple; the relating parts could refer to the parts of the description of embodiments of the method.

The embodiments described above are merely preferred embodiments of the present application, and not intended to limit the scope of the present application. Any modifications, equivalents, improvements or the like within the spirit and principle of the application should be included in the scope of the application.

The invention claimed is:

1. A method for identifying a slide, which is applicable in an electronic device, comprising:

obtaining file source code of a slide to be identified;

obtaining feature information of objects in the slide to be identified from the file source code; and determining a layout of the slide to be identified based on the obtained feature information;

wherein the objects comprise placeholders, and the feature information of the objects in the slide to be identified comprises at least one of: number information of the placeholders in the slide, size information of the placeholders in the slide, type information of the placeholders in the slide, position information of the placeholders in the slide, and sequence information of the placeholders in the slide;

wherein, when the feature information is the number information of the placeholders in the slide, obtaining feature information of objects in the slide to be identified from the file source code comprises:

finding all parameter names representing placeholders in the file source code to obtain the number information of the placeholders in the slide to be identified;

when the feature information is the size information of the placeholders in the slide, obtaining feature information of objects in the slide to be identified from the file source code comprises:

finding a parameter value, which relates to the size, corresponding to a parameter name of each placeholder to obtain the size information of each placeholder in the slide to be identified;

when the feature information is the type information of the placeholders in the slide, obtaining feature information of objects in the slide to be identified from the file source code comprises:

determining a type of each parameter name representing a placeholder in the file source code to obtain the type information of each placeholder in the slide to be identified;

when the feature information is the position information of the placeholders in the slide, obtaining feature information of objects in the slide to be identified from the file source code comprises:

determining, from the file source code, a horizontal distance from the top left corner of each placeholder to the left side of a baseplate of the slide and a vertical distance to the top side of the baseplate of the slide, and determining the horizontal distance and the vertical distance as the position information of this placeholder in the slide; and when the feature information is the sequence information of the placeholders in the slide, obtaining feature information of objects in the slide to be identified from the file source code comprises:

adding, according to a preset rule, a virtual two-dimensional rectangular plane coordinate system in the slide to be identified; obtaining the position of the center point of each placeholder; drawing straight lines with a preset slope respectively through the center points of the placeholders in the two-dimensional rectangular plane coordinate system, wherein each of the straight lines intersects with the y-axis of the two-dimensional rectangular plane coordinate system at a point; determining the sequence of the placeholders according to ordinate values of intersection points on the y-axis, and wherein the greater the ordinate value of an intersection point on the y-axis is, the smaller the sequence number for the corresponding placeholder will be, and if there are a plurality of straight lines corresponding to a plurality of placeholders intersect with y-axis at a same point, sequence numbers of the placeholders are determined in such a way that a sequence number of a placeholder on the left is smaller than a sequence number of a placeholder on the right; and obtaining the sequence information of each placeholder in the slide to be identified;

wherein the feature information of the objects comprises: connection elements between the placeholders, serial number elements corresponding to the placeholders, distances between the placeholders, and arrangement of the placeholders;

determining a layout of the slide to be identified based on the obtained feature information comprises:

determining that the layout of the slide to be identified is a step-style layout, based on that there are directional connection elements between the placeholders and the directivities of the connection elements are the same, or each of the placeholders has a corresponding serial number element;

determining that the layout of the slide to be identified is a cycle-style layout, based on that there are directional connection elements between the placeholders and any of the placeholders has only one connection element directing to that placeholder and one connection element that originates from that placeholder and directs to another placeholder;

determining that the layout of the slide to be identified is a summary-partition-style layout, based on that the distances from one placeholder to all the other placeholders are the same;

determining that the layout of the slide to be identified is a comparison-style layout, based on that all the placeholders are arranged in a two-dimensional list;

determining that the layout of the slide to be identified is a pyramid-style layout, based on that all the placeholders are arranged in a triangle or trapezoid;

determining that the layout of the slide to be identified is a tree-style layout, based on that there are connection elements that originate from a same placeholder and respectively direct to different placeholders; and determining that the layout of the slide to be identified is a parallel-style layout, based on that the layout of the slide to be identified is not any one of the step-style layout, cycle-style layout, summary-partition-style layout, comparison-style layout, pyramid-style layout, and tree-style layout.

2. The method of claim 1, wherein the electronic device is a server that stores slide templates with a plurality of layouts and is able to send the slide templates to a terminal device, and wherein the method further comprises:

finding a slide template with a determined layout in the server;

sending the found slide template to the terminal device such that the terminal device copies contents of each of the objects in the slide to be identified to a corresponding object in the received slide template to obtain a modified slide.

3. The method of claim 2, wherein the method further comprises:

receiving, from the terminal device, a modification instruction for the modified slide;

sending thumbnails of a plurality of slide templates corresponding to the modification instruction to the terminal device;

receiving, from the terminal device, identification information of a slide template that corresponds to a thumbnail selected by a user;

sending a slide template having the identification information to the terminal device, such that the terminal device copies the contents in each object in the modified slide to a corresponding object in the slide template with the identification information to obtain a modified slide.

4. The method of claim 1, wherein the electronic device is a terminal device that stores slide templates with a plurality of layouts, and wherein the method further comprises:

finding a slide template with a determined layout in the terminal device;

copying contents in each of the objects in the slide to be identified to a corresponding object in the slide template to obtain a modified slide.

5. An electronic device, comprising: a housing, a processor, a memory, a circuit board and a power supply circuit, wherein the circuit board is arranged inside a space enclosed by the housing, the processor and the memory are arranged on the circuit board; the power supply circuit is configured to supply power for various circuits or components; the memory is configured to store executable program codes; and the processor executes the executable program codes by reading the executable program codes stored on the memory for implementing the method for identifying a slide of claim 1.

6. A non-transitory storage medium, which is configured for storing executable program code, wherein the executable code is executed to implement the method for identifying a slide of claim 1.

7. An apparatus for identifying a slide, which is applicable in an electronic device, comprising:

a file source code obtaining module, configured for obtaining file source code of a slide to be identified;

an object feature information obtaining module, configured for obtaining feature information of objects in the slide to be identified from the file source code;

a slide layout determining module, configured for determining a layout of the slide to be identified based on the obtained feature information;

wherein the feature information of the objects in the slide to be identified comprises at least one of: number information of the placeholders in the slide, size information of the placeholders in the slide, type information of the placeholders in the slide, position information of the placeholders in the slide, and sequence information of the placeholders in the slide; and wherein, when the feature information is the number information of the placeholders in the slide, the object feature information obtaining module comprises:
a number information obtaining sub-module, configured for finding all parameter names representing placeholders in the file source code to obtain the number information of the placeholders in the slide to be identified;
when the feature information is the size information of the placeholders in the slide, the object feature information obtaining module comprises:
a size information obtaining sub-module, configured for finding a parameter value, which relates to the size, corresponding to a parameter name of each placeholder to obtain the size information of each placeholder in the slide to be identified;
when the feature information is the type information of the placeholders in the slide, the object feature information obtaining module comprises:
a type information obtaining sub-module, configured for determining a type of each parameter name representing a placeholder in the file source code to obtain the type information of each placeholder in the slide to be identified;
when the feature information is the position information of the placeholders in the slide, the object feature information obtaining module comprises:
a position information obtaining sub-module, configured for determining, from the file source code, a horizontal distance from the top left corner of each placeholder to the left side of a baseplate of the slide and a vertical distance to the top side of the baseplate of the slide, and determining the horizontal distance and the vertical distance as the position information of this placeholder in the slide; and;
when the feature information is the sequence information of the placeholders in the slide, the object feature information obtaining module comprises:
a sequence information obtaining sub-module, configured for adding, according to a preset rule, a virtual two-dimensional rectangular plane coordinate system in the slide to be identified; obtaining the position of the center point of each placeholder; drawing straight lines with a preset slope respectively through the center points of the placeholders in the two-dimensional rectangular plane coordinate system, wherein each of the straight lines intersects with the y-axis of the two-dimensional rectangular plane coordinate system at a point; determining the sequence of the placeholders according to ordinate values of intersection points on the y-axis, and wherein the greater the ordinate value of an intersection point on the y-axis is, the smaller the sequence number for the corresponding placeholder will be, and if there are a plurality of straight lines corresponding to a plurality of placeholders intersect with y-axis at a same point, sequence numbers of the placeholders are determined in such a way that a sequence number of a placeholder on the left is smaller than a sequence number of a placeholder on the right; and obtaining the sequence information of each placeholder in the slide to be identified;
wherein the objects comprise placeholders, and the feature information of the objects comprises: connection elements between the placeholders, serial number elements corresponding to the placeholders, distances between the placeholders, and arrangement of the placeholders;

the slide layout determining module comprises:
a step-style layout determining sub-module, configured for determining that the layout of the slide to be identified is a step-style layout, in response to that there are directional connection elements between the placeholders and the directivities of the connection elements are the same or each of the placeholders has a corresponding serial number element;
a cycle-style layout determining sub-module, configured for determining that the layout of the slide to be identified is a cycle-style layout, in response to that there are directional connection elements between the placeholders and any of the placeholders has only one connection element directing to that placeholder and one connection element that originates from that placeholder and directs to another placeholder;
a summary-partition-style layout determining sub-module, configured for determining that the layout of the slide to be identified is a summary-partition-style layout, in response to that the distances from one placeholder to all the other placeholders are the same;
a comparison-style layout determining sub-module, configured for determining that the layout of the slide to be identified is a comparison-style layout, in response to that all the placeholders are arranged in a two-dimensional list;
a pyramid-style layout determining sub-module, configured for determining that the layout of the slide to be identified is a pyramid-style layout, in response to that all the placeholders are arranged in a triangle or trapezoid;
a tree-style layout determining sub-module, configured for determining that the layout of the slide to be identified is a tree-style layout, in response to that there are connection elements that originate from a same placeholder and respectively direct to different placeholders;
a parallel-style layout determining sub-module, configured for determining that the layout of the slide to be identified is a parallel-style layout, in response to that the layout of the slide to be identified is not any one of the step-style layout, cycle-style layout, summary-partition-style layout, comparison-style layout, pyramid-style layout, and tree-style layout.

8. The apparatus of claim 7, wherein the electronic device is a server that stores slide templates with a plurality of layouts and is able to send the slide templates to a terminal device, and wherein the apparatus further comprises:
a first finding module, configured for finding a slide template with a determined layout in the electronic device; and
a first template sending module, configured for sending the found slide template to the terminal device such that the terminal device copies the contents in each object in the slide to be identified to a corresponding object in the received slide template to obtain a modified slide.

9. The apparatus of claim 8, wherein the apparatus further comprises:
a modification instruction receiving module, configured for receiving, from the terminal device, a modification instruction for the modified slide;
a thumbnail sending module, configured for sending thumbnails of a plurality of slide templates corresponding to the modification instruction to the terminal device;
an identification information receiving module, configured for receiving, from the terminal device, identification information of a slide template that corresponds to a thumbnail selected by a user;

a second template sending module, configured for sending a slide template having the identification information to the terminal device, such that the terminal device copies the contents in each object in the modified slide to a corresponding object in the slide template with the identification information to obtain a modified slide.

10. The apparatus of claim 7, wherein the electronic device is a terminal device that stores slide templates with a plurality of layouts, and wherein the apparatus further comprises:

a second finding module, configured for finding a slide template with a determined layout in the terminal device; and a content copying module, configured for copying contents in each of the objects in the slide to be identified to a corresponding object in the slide template to obtain a modified slide.

* * * * *

UNITED STATES PATENT AND TRADEMARK OFFICE
CERTIFICATE OF CORRECTION

PATENT NO. : 10,698,943 B2  
APPLICATION NO. : 15/780077  
DATED : June 30, 2020  
INVENTOR(S) : Juan Hu Page 1 of 1

It is certified that error appears in the above-identified patent and that said Letters Patent is hereby corrected as shown below:

On the Title Page

Under (73) Assignee: After "BEIJING KINGSOFT OFFICE SOFTWARE, INC., Beijing (CN)" insert -- ZHUHAI KINGSOFT OFFICE SOFTWARE CO., LTD., Zhuhai City (CN) and GUANGZHOU KINGSOFT MOBILE TECHNOLOGY CO., LTD., Guangzhou City (CN) --

Signed and Sealed this  
Eighth Day of March, 2022

Drew Hirshfeld  
*Performing the Functions and Duties of the*  
*Under Secretary of Commerce for Intellectual Property and*  
*Director of the United States Patent and Trademark Office*